United States Patent [19]

Roffelsen

[11] Patent Number: 4,646,823
[45] Date of Patent: Mar. 3, 1987

[54] PIPE FOR UTILITY OR SERVICE SYSTEMS

[75] Inventor: Franciscus Roffelsen, Helmond, Netherlands

[73] Assignee: Spiro Research B.V., Helmond, Netherlands

[21] Appl. No.: 737,175

[22] Filed: May 23, 1985

[30] Foreign Application Priority Data

May 24, 1984 [DE] Fed. Rep. of Germany ....... 3419304

[51] Int. Cl.⁴ ................................................ F28F 1/20
[52] U.S. Cl. ..................................... 165/181; 165/146
[58] Field of Search ................ 165/142, 146, 181, 184

[56] References Cited

U.S. PATENT DOCUMENTS

| 2,512,540 | 6/1950 | Friedman | 165/146 |
| 2,613,065 | 10/1952 | Didier | 165/146 |

FOREIGN PATENT DOCUMENTS

| 43822 | 12/1887 | Fed. Rep. of Germany | 165/142 |
| 633995 | 2/1962 | Italy | 165/86 |
| 835487 | 5/1960 | United Kingdom | 165/146 |

Primary Examiner—Stephen F. Husar
Attorney, Agent, or Firm—Toren, McGeady and Goldberg

[57] ABSTRACT

An economical pipe for use in a utility or service system, particularly a circulating hot water supply system or a heat exchanger system requiring outgoing and incoming hot water paths. The pipe possesses a partition wall dividing it longitudinally into two ducts.

2 Claims, 9 Drawing Figures

PIPE FOR UTILITY OR SERVICE SYSTEMS

This invention relates to a pipe for use in utility or service systems, especially hot water supply and heat exchanger systems.

In buildings having a hot water supply from a hot water tank installed at a lower level than the consumer points, usually in a basement, the problem arises that when there is a demand at a consumer point, i.e. by turning on a tap or faucet, quite a long time may pass before the hot water arrives at the consumer point. Large quantities of usually unused cool water are thereby wasted, which unnecessarily increases the water consumption and makes it expensive. This is particularly so in buildings having numerous consumer points, such as for example in hospitals. Furthermore, the drainage system and, in particular, the frequently limited capacity of the water works may be overloaded in treating the waste water.

For overcoming these disadvantages, circulating hot water systems are known having two pipe lines connected in parallel to the hot water tank and having a pump in one of the pipes for continually circulating the hot water through the pipe lines so that the consumer can obtain hot water immediately from the circulating water stream. However, this requires a complicated installation, which is rendered appreciably more expensive by the virtual doubling of the system components and the associated increased installation costs.

The aforementioned disadvantages can also apply in the case of pipes used for heating purposes, for example as heat exchangers in radiators of circulating hot water central heating installations. The efficiency of a cylindrical or flat heating pipe can be further increased by using the pipe as a support element, as is known, for a wire heat conducting system extending, preferably helically, along the length of the pipe. The wiring, which is preferably of copper and soldered to the surface of the pipe, defines a circular or approximately circular envelope when viewed longitudinally of the pipe, but the effective surface, i.e. the area which gives off heat to the environment, is many times larger than in conventional radiators. Even where there are only small differences between the temperature of the heating unit and that of the air surrounding it, the air is set in motion between the copper wires. The heated air rises and is replaced by further air, optionally assisted by a blower, which is then heated in turn by the wires. An air mass circulation is set up, and since large quantities of air are heated, very good heating results are obtained. A plurality of pipes wired in this manner can be combined to form a heat exchanger bundle, but a liquid (water) collecting box or header must be connected at the outlet end of the heat exchanger bundle, i.e. at the opposite end to the inlet.

The aim of the present invention is to overcome the aforementioned disadvantages and to create a pipe by which the difficulty and cost of installation of hot water supply and heat exchanger systems can be markedly reduced, and which at the same time makes possible improved utilization of the heat.

To this end, according to the invention, a pipe for use in utility or service systems, especially circulating hot water supply and heating systems, comprises a partition which subdivides the pipe longitudinally into two ducts, the partition preferably dividing the pipe centrally.

With this arrangement a circulating hot water supply system will no longer require a second pipe for the return water stream, and in the case of a radiator, the supplied hot water can, after the heat exchange, flow back in the second duct of the pipe to the water inlet end and there re-enter the supply circuit. A water collecting box or header at the end remote from the water inlet end can then be dispensed with.

The subdivision of the pipe may be achieved by inserting the partition into the pipe and bracing it therein. This can be done in a cylindrical pipe, for example, by deforming the cross-section of the pipe temporarily into an oval shape which enables the partition, e.g. in the form of a thin metal strip which is at least as wide as the original internal diameter of the pipe, to be pushed without difficulty into the oval pipe. When the deforming stress on the pipe is released, the pipe regains its initial cylindrical form and thereby grips the partition firmly in place. Alternatively, the partition may be subjected to prestress in the form of a folded or bent metal sheet, introduced into the cylindrical pipe in its compressed state and then released so that it bears against the inside of the pipe. In this way, later fitting of a partition into an already installed pipe is also possible.

When such a pipe in accordance with the invention is used in a circulating hot water supply system, uninterrupted circulation of the hot water out through one duct and back through the other may be effected by a water pump connected in a bypass communicating with one or other of the ducts. The bypass should be provided when the pump, on account of its large dimensions, cannot be connected directly in one of the ducts. The bypass, for which a conventional (i.e. not divided) pipe is used, will be extremely short and will not therefore add materially to the cost and expense of installing the system.

Consumer branch pipes may be connected in any desired number to the pipe so that each branch communicates with one or other of the ducts, and hot water is immediately available, whether drawn from either duct or simultaneously from both.

The benefit in using a pipe in accordance with the invention for heat exchange purposes may be improved by attaching wires to the periphery of the pipe, for example equipping the pipe with wires distributed around its periphery to resemble a hedgehog, or preferably in the form of wire coils which extend helically along the length of the pipe.

Increased heating efficiency can, according to a further aspect of the invention, be achieved both for a divided pipe and for a conventional pipe, by providing the pipe with wires attached to and projecting from its periphery, the wires being distributed around the circumference of the pipe asymmetrically with regard to the projecting length and/or density of distribution. The distribution density of the wires may also be varied along the length of the pipe. Preferably the wires are rectilinear wire pieces or coils of twisted profile wire which are attached helically around the pipe over its entire length.

The arrangement in accordance with this aspect of the invention is based on the knowledge that, when a medium flows transversely across a pipe, the medium follows a quite specific flow pattern. In the centre, viewed in the direction of flow, there is a free or dead zone in which hardly any medium enters. The medium is instead deflected and conducted laterally around the pipe. The flow pattern may be compared, starting from the centre with no flow as the zero point, approximately to the geometry of an epicycloid, i.e. a heart-shaped curve or cardioid.

Since heat transfer cannot take place in the region of the free or dead zone, a pipe conventionally disposed horizontally for heating an ascending stream of air or other medium should be wired in such a manner that the portion of the pipe facing towards the ascending air possesses little or no wiring. The upwardly flowing air, possibly accelerated additionally by blowing, becomes heated up in those zones where heat transfer is to be expected, namely in the circumferential region of the pipe situated outside the free zone, which amounts to approximately 300° to 340° of arc. Asymmetrical wiring comprising longer and/or more densely arranged wires in the region of the actual air stream, and therefore in the effective heat transfer region, and no, or only a few and possibly also shorter, wires in the region of the zone subjected to little or no flow, is therefore recommended. Apart from the improved heating efficiency, an optimization of cost and material in the production of the wiring is also obtained.

If the wired pipe is a divided pipe, its heat transfer efficiency may be still further increased if the wires are distributed more densely in the region of the outgoing hot water duct than in the region of the other duct, and if the outgoing water duct is at the top in an arrangement where the pipe is disposed across an ascending air stream. Thus the hot outgoing water is situated underneath the denser wiring of the region important for heat transfer to the flowing air, while the cooler return water is conducted back in the duct adjoining the zone of little or no air movement, where on account of the ineffective heat transfer the pipe possesses little or no wiring.

Examples of a pipe in accordance with the invention, and its uses, will now be described with reference to the accompanying drawings, in which.

Figure 1:
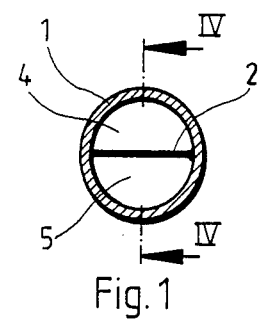
FIG. 1 is a radial section through one example of a cylindrical pipe in accordance with the invention.
Figure 2:
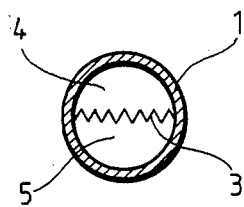
FIG. 2 is a view similar to FIG. 1 but of a different example.

FIGS. 1 and 2 show cylindrical pipes 1 with partition walls 2, 3 located diametrically across the centre and extending along the entire length of the pipes, each partition dividing its pipe into two ducts 4, 5. Each partition 2, 3 is braced in the interior of the pipe, which in the case of the partition 2 shown in FIG. 1 is achieved by a bracing force exerted by the pipe after release of a stress deforming the pipe cross-section temporarily into an oval shape to permit insertion of the partition 2. In contrast, the partition 3 shown in FIG. 2 can be compressed to a width which is less than the internal diameter of the pipe, so that the partition 3 can be pushed into the pipe before being released to allow it to expand and bear against the inner wall of the pipe in a centering manner. Any leaks which may occur at the junctions between the partition and the pipe are negligible, since at most a small exchange of liquid will take place between the two ducts 4 and 5 and, in use, the same liquid will be flowing in the two ducts.

Figure 3:
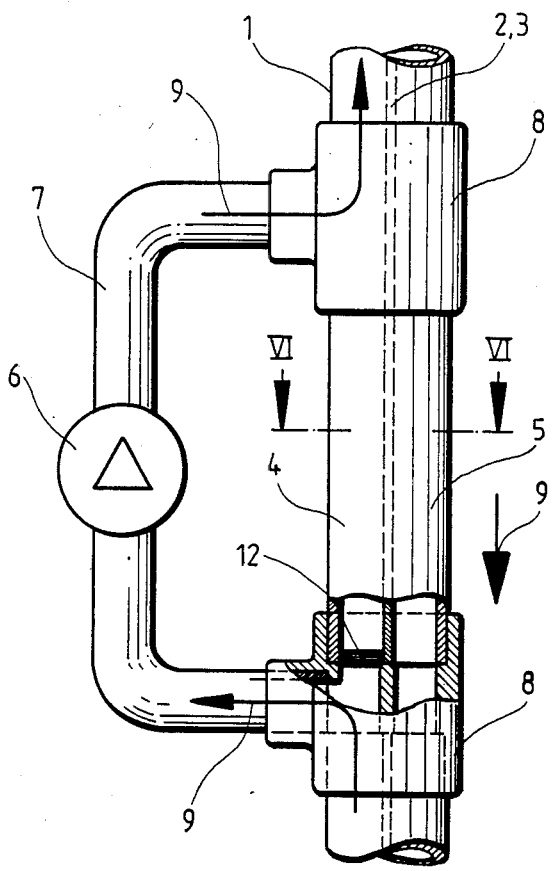
FIG. 3 is a side view, partly in section, of a length of pipe in accordance with the invention fitted with a bypass.
Figure 6:
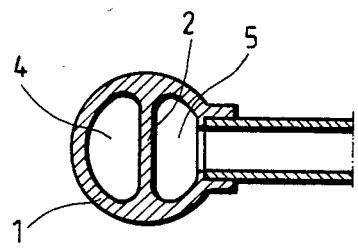
FIG. 6 is a radial section through a pipe in accordance with the invention having a consumer branch connected directly to one duct of the pipe.
Figure 5:
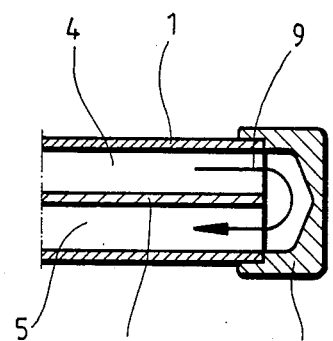
FIG. 5 is an axial section through the end zone of a pipe in accordance with the invention fitted with a closure cap such as is shown in FIG. 7.
Figure 7:
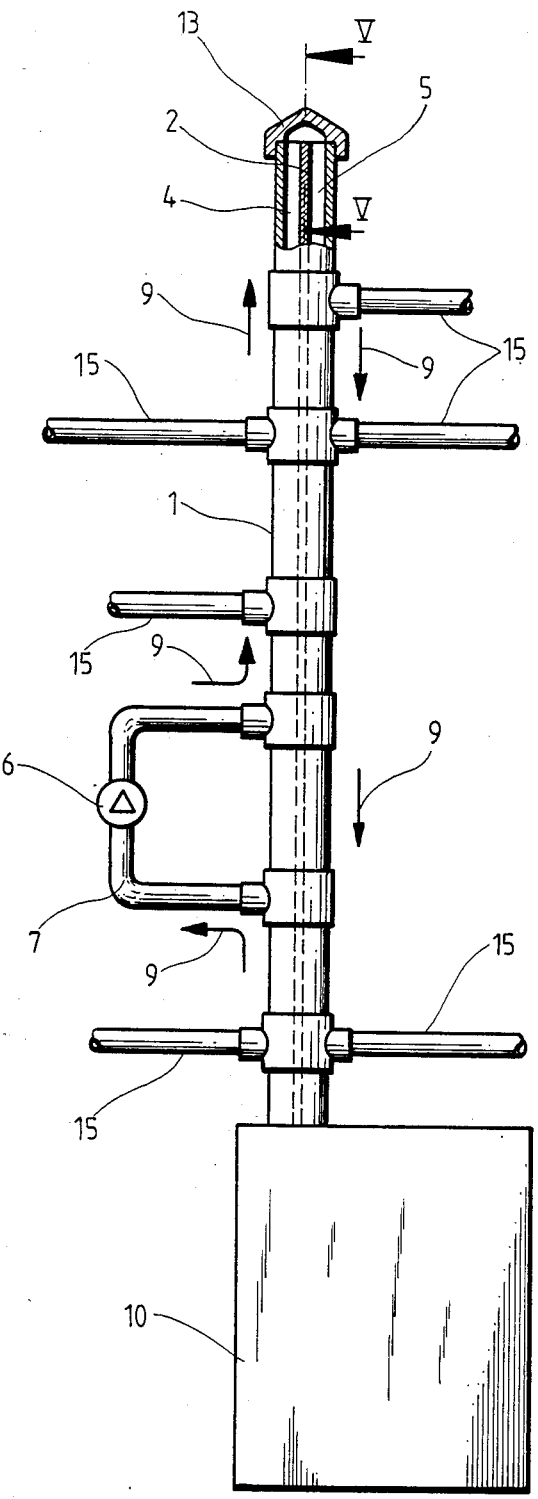
FIG. 7 is a schematic view illustrating an example of a hot water supply system formed with a pipe in accordance with the invention and including a plurality of consumer branches connected to the pipe and also a bypass containing a pump.

If the divided pipe 1 is used for a continually circulating hot water supply system, a circulating pump 6 may be disposed in a short bypass pipe 7 which is connected by two connecting sleeves 8 to the pipe 1 so that the bypass communicates with one of the ducts, e.g. the duct 4, as shown in FIGS. 3 and 7. When the pump runs, the hot water entering the duct 4 of the pipe 1 from a hot water boiler 10 (see FIG. 7) circulates in the direction indicated by the arrows 9. As soon as the water enters the upstream connecting sleeve 8 it is deflected into the bypass 7, for which purpose the connecting sleeve 8 possesses a deflector plate 12 closing the duct 4. The water stream then passes through the pump 6 and is conducted back from the pump into the duct 4, via the bypass 7 and the second connecting sleeve 8. The water stream is then conducted to the end of the pipe 1, where it changes direction and flows into the other duct 5. For this purpose the pipe is closed with an end cap 13 (FIG. 5) which prevents escape of water from the pipe while permitting the water to flow from the duct 4 into the duct 5 so that it can flow back to the boiler 10. The bypass 7 could equally well be connected to the duct 5, that is to the return line of the water stream, instead of the duct 4.

Figure 4:
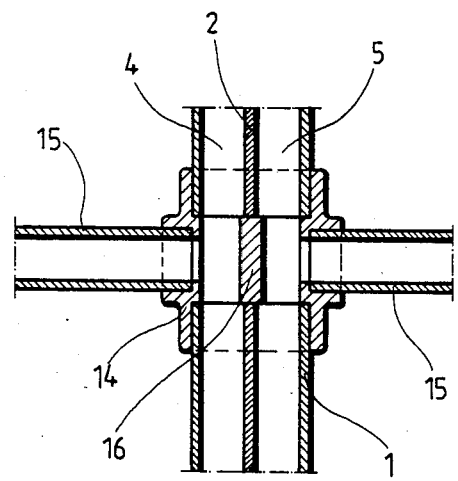
FIG. 4 is an axial section through a portion of pipe in accordance with the invention including a coupling piece connecting two consumer branches to the pipe.

Any number of consumer branch pipes 15 can be connected to the pipe 1, communicating with either one or both ducts 4, 5. In the arrangement shown in FIG. 4, two mutually opposite consumer branches 15 are connected by a coupling member 14 inserted into the pipe 1, one branch communicating with the duct 4 and the other to the duct 5. In order that the pipe division into two ducts shall continue through the coupling member 14, this member likewise contains a central wall 16, which amplifies and closes the partition 2 in the longitudinal direction of the pipe 1 as far as possible without transition.

Figure 8:
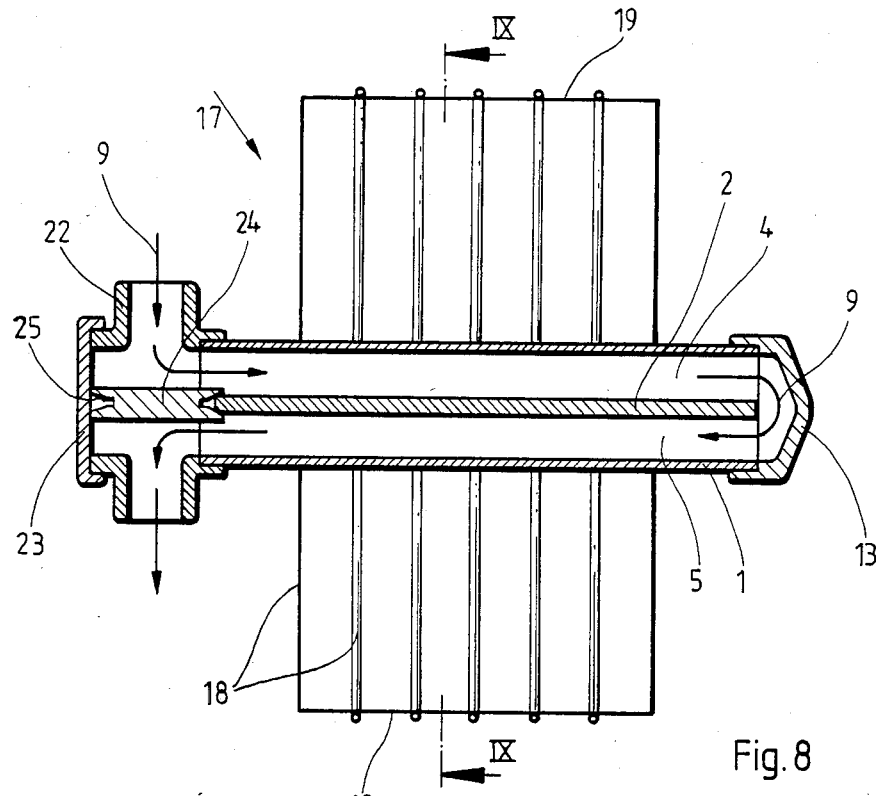
FIG. 8 is an axial section through a pipe in accordance with the invention fitted with external wiring for heat exchange purposes; and, FIG. 9 is a radial section through the pipe of FIG. 8, taken on the line IX—IX.

In the example shown in FIG. 8, the pipe 1 is equipped externally with wiring 17, and is suitable particularly for use in radiators or heat exchanger bundles. The wiring 17 may consist of individual wires 18 which are externally soldered onto the cylindrical pipe 1, or can be helically laid as helices around the pipe. Copper is preferred as the material for the wire, on account of its good thermal conductivity. For stiffening the outer ends, the wires 18 may be connected to one another by a head wire 19.

The pipe 1, wired in this manner, may be connected at its inlet end to a hot water feed pipe 22. In the region of the connection, a disc-shaped member 23 having a plate 24 for blocking the cross-section of the feed pipe 22 is inserted from outside so that the partition 2 of the pipe 1 engages sealingly with the plate 24, for example in a recess 25 in the edge of the plate 24. The plate 24 thus deflects the hot water flowing in the pipe 22 in the direction of arrow 9 into the duct 4 of the pipe 1, where heat is transferred from the water, through the pipe 1 and the wiring 17, to the surrounding medium, e.g. air which flows upwards around the pipe 1 and through the wiring 17 as indicated by the arrows 26. An end cap 13 fitted onto the pipe at its end remote from the inlet deflects the outgoing water stream from the duct 4 into the return duct 5, which carries the water back into the feed pipe 22 on the opposite side of the plate 24.

Figure 9:
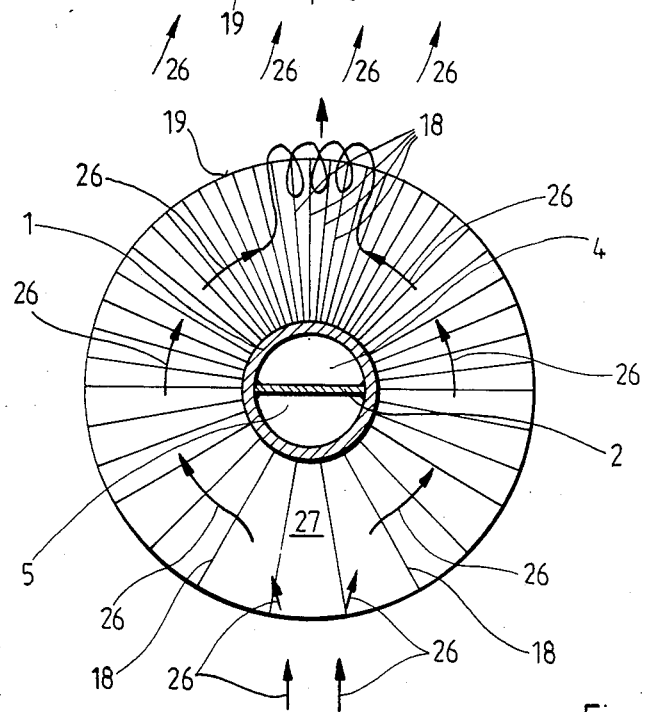

The heat transfer to the medium ascending and flowing through the wiring 17 in the direction of the arrows 26 can be improved if only a few wires 18, or even none at all, are disposed on the pipe 1 in the region 27 located underneath the pipe 1 where substantially no movement of the medium occurs on account of the flow conditions around the pipe 1. The flow of the medium divides underneath the pipe 1, in the region of the duct 5, into two streams (as shown in FIG. 9) which flow to the left and right around the pipe 1 and recombine in the region above the duct 4. The efficiency can be further improved if, in the regions traversed by the moving medium, and particularly on the upper side of the pipe in the region of the duct 4, the wires 18 are arranged to be longer and/or more densely distributed on the pipe wall.

The wired heat exchange pipe may be used to transfer heat not only to gaseous media, particularly air, but also to liquid media.

I claim:

1. A heat exchange system comprising an axially elongated pipe having an inner surface, an outer surface and an axially extending flow passage bounded by said inner surface, a partition located within said flow passage and extending in the axial direction of said pipe and across the flow passage between opposite locations along the inner surface and dividing the flow passage into coextensive first and second flow passageways, wiring extending around and outwardly from the outer surface of said pipe with said wiring varying in density per unit of area of said outer surface in the circumferential direction around said pipe, wherein the improvement comprises said pipe is arranged to extend transversely of a rising fluid stream so that the outer surface of said pipe has an axially extending first partial surface facing oppositely to the direction of flow of the rising fluid stream and a second partial surface located opposite said first partial surface and facing in the direction of flow of the rising fluid stream, said wiring extending around said first partial surface and said second partial surface with the density of said wiring being less on said first partial surface as compared with the density of said wiring on said second partial surface.

2. A heat exchange system, as set forth in claim 1, wherein a heating fluid medium is arranged to flow through said pipe with the heating fluid medium flowing first through said first flow passageway and then through said second flow passageway and said pipe being arranged so that said partition extends transversely across the direction of flow of the rising fluid stream with said first flow passageway being in heat transfer relation with said second partial surface and said second flow passageway being in heat transfer relation with said first partial surface.

* * * * *